Jan. 24, 1928.

H. LUDWIG 1,657,265

DRIVER FOR FREE WHEEL HUBS

Filed Oct. 27, 1926

H. Ludwig
inventor

By: Marks & Clerk
Attys.

Patented Jan. 24, 1928.

1,657,265

UNITED STATES PATENT OFFICE.

HANS LUDWIG, OF HOMBURG, GERMANY, ASSIGNOR OF ONE-HALF TO STEMPELWERK G. M. B. H., OF MAINKUR, NEAR FRANKFORT-ON-THE-MAIN, GERMANY.

DRIVER FOR FREE-WHEEL HUBS.

Application filed October 27, 1926, Serial No. 144,632, and in Germany September 26, 1925.

In free wheel hubs in which an axially displaceable conical driver is employed as a friction clutch for driving the hub, it has already been proposed to groove this driver on the surface, for the purpose of obtaining thereby an immediate engagement and undisturbed co-operation with the co-acting cone of the hub sleeve. The grooving completely fulfils its purpose, but in the course of time impressions are produced on the counter-cone by the working edges of the grooves, and these impressions ultimately lead to the destruction thereof. This arises from the fact that for the change in the engagement of the grooves on the counter-cone only very small surfaces, equal to the distance between two grooves, are available, so that these grooves very often come to bear at the same places.

In order to remove this objection it has also been proposed to provide the surface of the driver with grooves in any direction, whereby narrow strips of surface are produced. These fulfil the object in view at the beginning, so long as the surface has a certain degree of roughness, so that their adhesive power to the counter-cone is sufficient. After a comparatively short time, however, a polishing of the surface strips of the driver takes place, which leads more and more, upon the closing of the clutch, to a slipping of the driver in the counter-cone, the amount of slipping being small at first but increasing with time, so that ultimately the driver clutch wears out or fails.

The object of the present invention is to counteract these disadvantages, by employing for the driver surface, a grooving which is from certain points of view uninterrupted, together with a different hardening of the driver and the counter-cone of the hub sleeve. By this means the goal is attained of a clutch of the kind set forth which is free from objection in the engaging of the driver and in its undisturbed cooperation with the counter-cone.

The accompanying drawing illustrates one constructional form of the invention.

Figure 1:
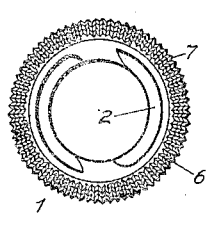

Figure 1 is a front elevation, and

Figure 2:
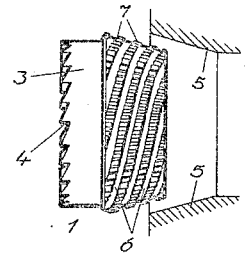

Figure 2 a side elevation of the driver, the hub sleeve being indicated by an outline of the counter-cone.

Figure 3:
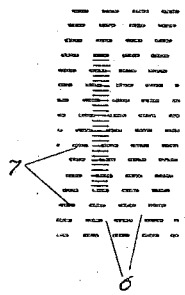

Figure 3 shows a development of the driver surface.

The driver 1 consists in a known manner of a partly conical sleeve, which is equipped internally with a flat screw thread 2 of high pitch for the axial displacement of the driver. At the edge of the cylindrical part 3 of the driver 1 there may be fitted for example another claw coupling 4, which serves for coupling to the braking apparatus. In order however, to bring the driver 1 into operative engagement with the counter-cone 5 of the hub sleeve, its surface is roughened in any suitable manner.

This roughening, according to the present invention, is obtained in a novel manner by forming on the conical surface of the driver two sets of grooves transverse to one another. The grooves 6 run spirally and the grooves 7 axially or obliquely. By this means small roof-shaped protuberances are formed, which terminate in an edge. In the case of the present invention there is a considerable amount of free space on the surface of the counter cone 5 between the points of engagement of the protuberances between the grooves 7 of the driver 1. By this means the possibility of the protuberances always acting on the same parts of the counter cone is very small, whereby the danger is avoided of indentations being formed in the counter cone 5 in the course of time, which would eventually lead to the destruction of the counter cone by the surface being scraped off. Figure 3 shows diagrammatically to an enlarged scale the points of engagement on the counter cone 5 of some of the protuberances between the grooves 7. If it be assumed that the minimum distance between the impression points at which these points can be considered separate is about 0.25 mm., and that the grooves which lie on the same circumferential line, that is to say which are equidistant from the edge of the driver, are spaced apart by a gap which is equal to the space occupied by eight grooves 7 measured along the spiral, then a single protuberance can engage the counter cone 5 at about 27 different points on its surface (see the thin lines in Fig. 3), without engaging it at the same point twice. If the grooves were arranged in straight circumferential rows instead of spirally, only three different engagement points on the counter cone would be possible for each protuberance.

In order furthermore to take care that no impressions are produced in the course of time on the counter-cone 5 by the grooves 7, the counter-cone is hardened. The same step is taken with the driver 1, in order to give the grooves 7, with their small extent, sufficient power to resist premature wear by the grinding away of the points or edges. The hardness of the driver 1, however, should exceed that of the counter-cone 5. By this means, as experiments have shown, a resilient impressing of the grooves 7 in the surface of the counter-cone 5 when coupling the two together is obtained, without a permanent impression remaining in the counter-cone 5. In this phenomenon likewise resides one of the main advantages of the invention.

What I claim is:—

1. A driver for free wheel hubs, the surface of said driver being formed with two sets of grooves, one set extending spirally round said surface and the second set extending substantially transversely to the first set so as to form sharp protuberances on the surface.

2. A driver for free wheel hubs, the surface of said driver being formed with two sets of grooves, one set extending spirally round said surface and the second set extending substantially axially along said surface so as to form sharp protuberances on the surface.

3. A clutch for free wheel hubs, comprising a driver and a co-acting cone, the surface of said driver being formed with two sets of grooves, one set extending spirally round said surface and the second set extending substantially transversely to the first set, so as to form sharp protuberances on the surface.

4. A clutch for free wheel hubs, comprising a driver and a co-acting cone, the surface of said driver being formed with two sets of grooves, one set extending spirally round said surface and the second set extending substantially axially along said surface, so as to form sharp protuberances on the surface.

5. A clutch for free wheel hubs, comprising a driver and a co-acting cone, the surface of said driver being formed with two sets of grooves, one set extending spirally round said surface and the second set extending substantially transversely to the first set, the grooved surface of the driver and the co-acting surface of the cone both being hardened.

6. A clutch for free wheel hubs, comprising a driver and a co-acting cone, the surface of said driver being formed with two sets of grooves, one set extending spirally round said surface and the second set extending substantially axially along said surface, the grooved surface of the driver and the co-acting surface of the cone both being hardened.

7. A clutch for free wheel hubs, comprising a driver and a co-acting cone, the surface of said driver being formed with two sets of grooves, one set extending spirally round said surface and the second set extending substantially transversely to the first set, the grooved surface of the driver and the co-acting surface of the cone both being hardened, and the hardness of the driver surface exceeding that of the co-acting surface.

8. A clutch for free wheel hubs, comprising a driver and a co-acting cone, the surface of said driver being formed with two sets of grooves, one set extending spirally round said surface and the second set extending substantially axially along said surface, the grooved surface of the driver and the co-acting surface of the cone both being hardened, and the hardness of the driver surface exceeding that of the co-acting surface.

In testimony whereof I have signed my name to this specification.

HANS LUDWIG.